United States Patent [19]

Billings et al.

[11] Patent Number: 4,717,882
[45] Date of Patent: Jan. 5, 1988

[54] SNAP OVER LENS ASSEMBLY

[75] Inventors: David L. Billings, Brockport; Raymond T. Blythe, Rochester, both of N.Y.

[73] Assignee: Qualitrol Corporation, Fairport, N.Y.

[21] Appl. No.: 779,950

[22] Filed: Sep. 25, 1985

[51] Int. Cl.[4] .................. G01D 13/26; H01F 7/08
[52] U.S. Cl. ..................... 324/415; 116/307; 200/336; 200/56 A; 335/225
[58] Field of Search .............. 324/415, 157, 156, 74; 340/688; 200/155 A, 302.1, 332, 336, 56 R, 56 A, 11 R; 335/225; 116/297, 307; 73/709

[56] References Cited
U.S. PATENT DOCUMENTS

| 2,855,484 | 10/1958 | Kreuter | 200/11 R |
| 3,291,617 | 12/1966 | Baker et al. | 116/297 X |
| 3,579,107 | 5/1971 | Butennoff et al. | 324/157 |
| 4,196,690 | 4/1980 | Alinari | 73/709 X |

FOREIGN PATENT DOCUMENTS

| 55131 | 12/1981 | European Pat. Off. |  |
| 7710217 | 11/1977 | Fed. Rep. of Germany. |  |
| 238443 | 8/1986 | Fed. Rep. of Germany. |  |
| 253503 | 11/1948 | Switzerland | 116/297 |

Primary Examiner—Reinhard J. Eisenzopf
Assistant Examiner—Robert W. Mueller
Attorney, Agent, or Firm—Charles L. Johnson, Jr.

[57] ABSTRACT

A rotatable one-piece lens assembly that may be rotated relative to the instrument housing comprising a lens boss, integral with the lens, moving with the rotated lens to move the pointer to engage and test the switches. After the switch test the lens may then be rotated back to its normal position. In this manner the switches are tested without removing the lens from the instrument housing.

2 Claims, 4 Drawing Figures

SNAP OVER LENS ASSEMBLY

FIELD OF INVENTION

This invention relates to readable instruments having pointer shaft driven switches and more particularly to a one-piece lens assembly for use with such an instrument which simplifies the testing of the switches.

PRIOR ART

In the past the most common arrangement of lens and instrument housing having switches required the removal of the lens from the instrument housing in order to test the switches. The procedure was to physically remove the lens from the instrument and manually rotate the instrument pointer shaft until it engaged the switches, thereby testing the switches. After this, the pointer was returned to the normal position and the lens re-mounted on the instrument housing.

SUMMARY

This invention provides a rotatable one-piece lens assembly that may be rotated relative to the instrument housing. A lens boss, integral with the lens, moves with the rotated lens to move the pointer to engage and test the switches. After the switch test the lens may then be rotated back to its normal position. In this manner the switches are tested without removing the lens from the instrument housing.

DESCRIPTION OF THE FIGURES

FIG. 3 is a cross-sectional view of the lens assembly section 3—3 of FIG. 2.

DESCRIPTION OF INVENTION

The invention is an improved lens assembly which permits the testing of instrument switches without removing the lens from the instrument housing.

Figure 1:
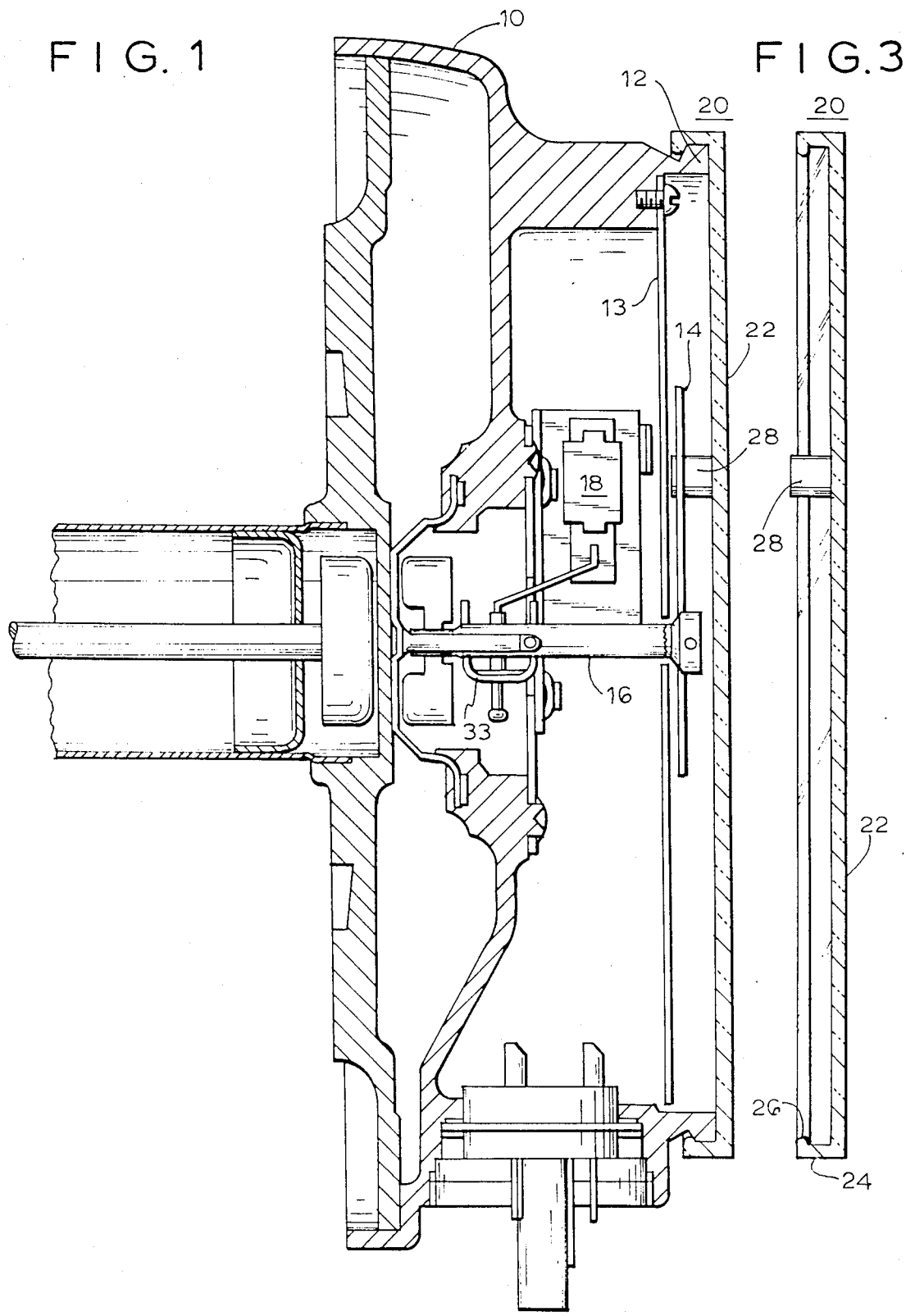
FIG. 1 is a cross-sectional view of an instrument housing with the lens assembly attached.
Figure 2:
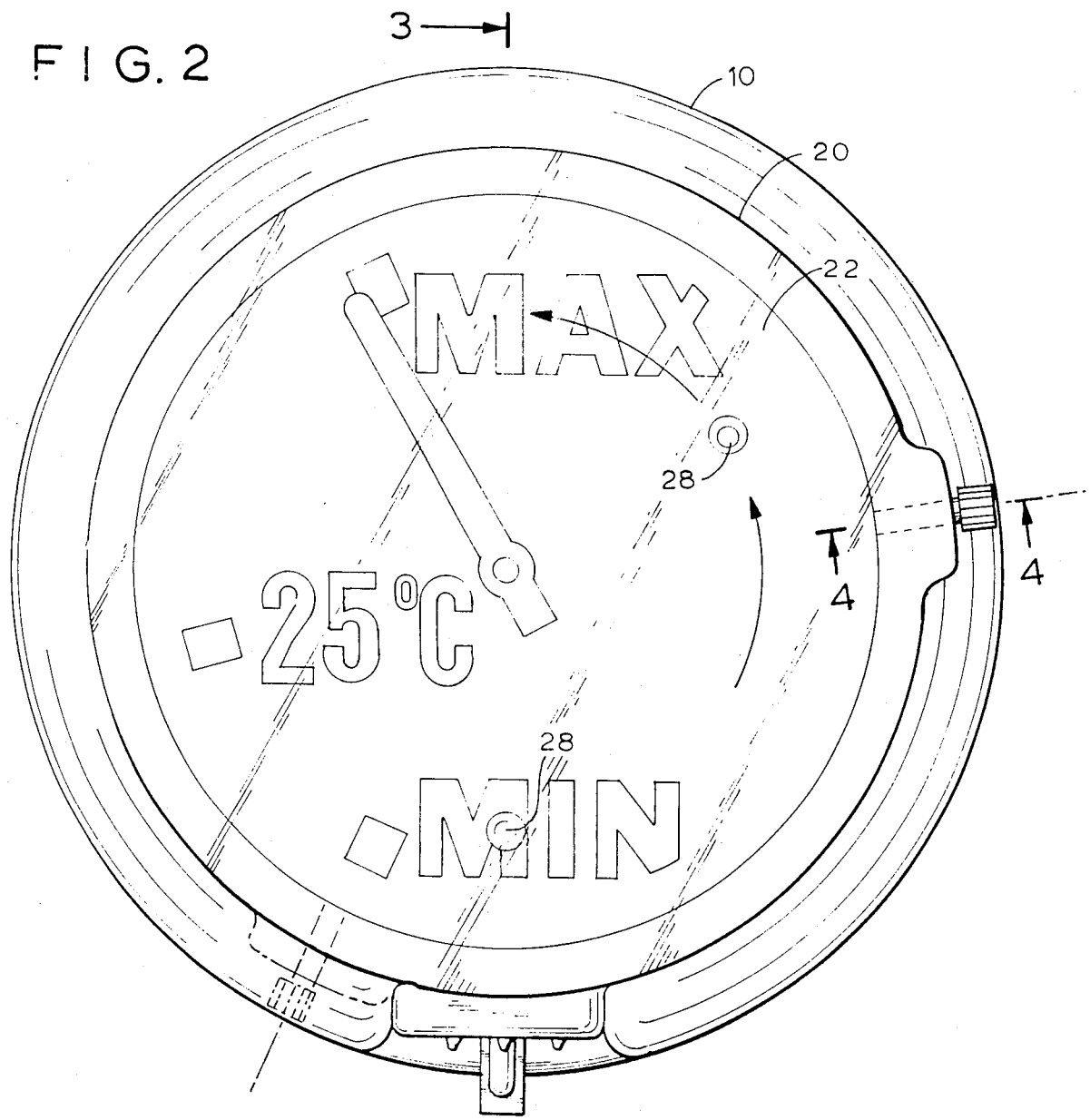
FIG. 2 a front view of the lens assembly and instrument housing.
Figure 4:
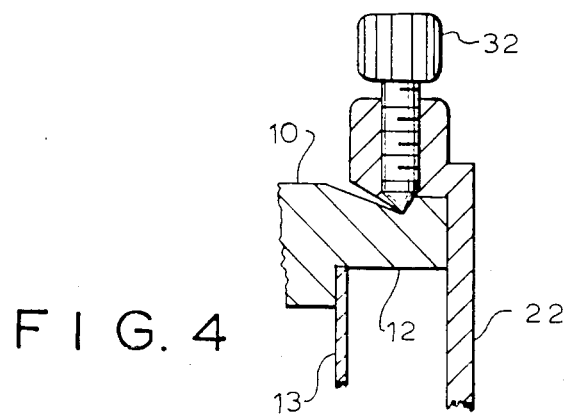
FIG. 4 is a detail of the lens assembly securing means from section 4—4 of FIG. 2.

FIGS. 1 and 2 show an instrument housing 10 upon which a lens assembly 20 is mounted. The instrument housing 10 includes a lip 12, a dial face 13, a pointer 14, a pointer drive shaft 16, a switch 18, switch actuator 19, and cam 33.

The lens assembly 20 as shown in FIGS. 1, 2 and 3 includes a flat lens surface 22 which is round in the preferred embodiment. The lens assembly 20 also includes a curved shoulder or bezel 24 and inside rim 26 for engaging the housing lip 12. The lens assembly 20 is made of a clear flexible material that flexes to snap over the lip 12 of the instrument housing 10.

Formed as part of the lens assembly 20 is the lens boss 28.

Securing the lens assembly 20 against rotation - relative to the instrument housing 10 is a securing device 30, which, in the preferred embodiment includes the set screw 32. As illustrated in FIG. 2, to test the switch 18 without removing the lens assembly 20 from the instrument housing 10, the set screw 32 is loosened. The lens assembly 20 is then rotated so the lens boss 28 moves to engage the pointer 14 and rotates the pointer 14 until the switch actuator 19, carried by the pointer drive shaft 16, activates the switch 18, via the cam 33. In this way the switch 18 is tested to confirm that it operates, without removing the lens assembly from the instrument housing 10. Once the test is completed the lens assembly may be rotated back to its initial position and secured in place by the securing means 30, including set screw 32.

From the above it may be seen that switch testing may be carried out, in the field, without exposing the instrument housing to surrounding contaminants.

In the preferred embodiment the lens assembly is molded from clear polycarbonate.

Although the preferred embodiment is shown applied to a round instrument housing, the invention is not limited to such a configuration.

The invention relates to both the method and apparatus for carrying it out.

The boss 28 may be an integral part of the lens assembly 20 or may be a separate piece which is secured to the lens assembly by any of several well-known methods.

What is claimed is:

1. A one piece snap-on lens assembly for mounting on an instrument housing have a dial, pointer and pointer shaft-operated switch comprising, a round flat surface through which the dial and pointer may be viewed, a curved bezel portion at the periphery of the round flat surface, said bezel being extended to flexibly engage the instrument housing.

a boss portion integrally formed with the flat surfaoe of the lens, and securing means operative to alternatively secure the lens assembly to the instrument case or permit rotation of the lens assembly so as to move the boss in an arcuate path to engage the pointer so as to move it to activate the pointer shaft-activated switch to test the switch.

2. An instrument including means for testing an internal limit switch comprising, an instrument housing including dial means, switch, pointer and switch actuating means corresponding to the position of the said pointer for actuating the said switch upon the event of the pointer reaching a pre-set position, a one-piece snap over lens assembly mounted on the instrument housing having a round flat surface through which the dial and pointer may be viewed, a curved bezel portion at the periphery of the round flat surface, said bezel being extended to flexibly engage the instrument housing, a boss portion integrally formed with the flat surface of the lens, and securing means operative to alternatively secure the lens assembly to the instrument housing or permit rotation of the lens assembly so as to move the boss in an arcuate path to engage the pointer so as to move it to activate the pointer shaft-activated switch to test the switch.

* * * * *